United States Patent [19]

Reichen

[11] Patent Number: 5,241,810

[45] Date of Patent: Sep. 7, 1993

[54] HEIGHT OF COT ADJUSTMENT MECHANISM FOR REEL MOWERS

[75] Inventor: Ronald L. Reichen, Horicon, Wis.

[73] Assignee: Deere & Company, Moline, Ill.

[21] Appl. No.: 894,493

[22] Filed: Jun. 5, 1992

[51] Int. Cl.$^5$ .......................................... A01D 34/54
[52] U.S. Cl. .................................... 56/249; 56/17.1; 56/17.2; 56/320.1
[58] Field of Search ..................... 56/17.1, 17.2, 249, 56/320.1, 320.2

[56] References Cited

U.S. PATENT DOCUMENTS

| | | |
|---|---|---|
| 829,562 | 8/1906 | Werth et al. |
| 2,507,758 | 5/1950 | Daggett .......................... 56/17.2 X |
| 2,671,300 | 3/1954 | Kinkead ............................. 56/249 |
| 2,924,055 | 2/1960 | Clemson ....................... 56/17.2 X |
| 3,802,173 | 4/1974 | Opitz ................................ 56/17.2 X |

OTHER PUBLICATIONS

Manual, Entitled: "3325 Professional Turf Mower Technical Manual"; published in Apr. 1991 by Deere & Co. Horicon Works; pp. 80-05-26, 80-05-27, 80-05-28, 80-05-29, 80-05-30, 80-05-31.
Sales brochure published by a company known as Ransommes and illustrating mechanisms which were for sale prior to the invention of the subject matter of the present application.
Brochure published by a company known as Ransommes and illustrating mechanisms which were for sale prior to the invention of the subject matter of the present applicaiton; p. 30.
Sales brochure entitled "Fairway 5000 Mower"; published by Ransomes and illustrating mechanisms which were for sale prior to the invention of the subject matter of the present applicaiton, 2 pages.
Brochure entitled: "Toro 8 and 11 Blade Cutting Unit Greensmaster 3000"; publshished by The Toro Company in 1989; front cover and p. 3.
Brochure published by The Toro Company and illustrating mechanisms which were for sale prior to the invention of the subject matter of the present applicaiton; p. 69.
Brochure entitled: "Toro Reelmast 216 Operator's Manual", published by The Toro Company in 1988; front cover and pp. 8-10.
Brochure entitled: "Jacobsen Operator's manual Tri-King 1671D, Tri-King 1684D"; published by Jacobsen in Jul. 1990, front cover and p. 24.
Brochure entitled: "Jacobsen HF-5 Operator's manual and Parts List"; published by Jacobsen in May 1989, front cover and p. 14.
Brochure entitled: "Jacobsen HF-5 Operator's Manual and Parts List"; published by Jacobsen in May 1989, front cover and p. 14.
Brochure entitled "Jacobsen Parts Catalog Tri-King 1671D, Tri-King 1684D"; published by Jacobsen in Jul. 1990, front cover and pp. 24 and 25.

*Primary Examiner*—George A. Suchfield

[57] ABSTRACT

A mechanism for adjusting the height at which vegetation is cut by a reel mower cutting unit, including a plurality of rack members each coupled with a respective corner of the cutting unit frame, the rack members each having a plurality of teeth vertically arranged, a plurality of bracket members coupled with ground engaging roller means, each of the bracket members having a plurality of generally vertically arranged teeth engagable with the teeth of a respective rack member for generally preventing vertical shifting of the bracket member with respect to the rack member and cutting unit, and for setting the vertical position of the cutting unit with respect to the ground engaging roller means, thereby setting the height at which vegetation is cut by the cutting unit, and means for individually fine adjusting the vertical position of each rack member with respect to the cutting unit, for fine adjusting the height at which vegetation is cut and for leveling the cutting unit in both the lateral and fore and aft directions.

26 Claims, 4 Drawing Sheets

HEIGHT OF COT ADJUSTMENT MECHANISM FOR REEL MOWERS

BACKGROUND OF THE INVENTION

This invention relates to reel mowers, and mechanisms for changing the cutting height of reel mowers.

Conventional reel mowers provide a plurality of blades coupled together to form a generally cylindrical reel which rotates about a horizontal axis. The blades pass in close proximity to a bedknife to create a scissoring action for cutting vegetation such as grass. A frame typically houses the reel and bedknife. Wheels, rollers or skids are coupled to the frame for engaging or rolling across the ground to operatively support the reel and bedknife at a predetermined height above the ground. The height at which the grass is cut is therefore determined by the height at which the wheels, rollers or skids carry the frame, reel and bedknife above the ground. Reel mowers are typically used for mowing golf courses or other areas where a relatively low and accurate cut is desirable.

It is known to provided reel mowers with mechanisms for adjusting the height at which the grass is cut. A first type of height adjustment mechanism utilizes a plurality of vertically aligned holes formed in the cutting unit frame. The rollers are coupled to a mounting member or plate which includes an opening. The mounting plate is coupled to the frame by insertion of a pin through both the mounting plate opening and one of the holes defined by the cutting unit frame. The cutting height can be varied by inserting the pin through a different hole in the frame. The forces encountered by the rollers during operation are transferred through the mounting plate and pin mechanism and into the cutting unit frame. In order to maintain proper strength and rigidity in the frame, the holes formed by the frame must be positioned a sufficient distance from each other in order for the frame to withstand the loads from the rollers. The holes may therefore be spaced relatively far apart from each other, which results in the cutting height being adjustable in only large increments. Furthermore, differences in tolerances between the pins and holes may create gaps between the pieces of the mechanism, and may allow the mechanism to rattle or shift slightly. The rattling of the mechanism may allow the connection to wear and shift further, thereby causing an inaccurate or poor quality of cut. Also, pin connections of this type typically involve loose parts that may be lost during field adjustments.

A second type of height adjustment mechanism provides a roller coupled with a vertically extending threaded bolt. The bolt is shiftably received within an opening formed by a portion of the cutting unit frame. The bolt is shiftable up and down within the opening for adjusting the relative positions of the roller and cutting unit frame to thereby vary the cutting height. The bolt is held in vertical position by a pair of nuts which are threaded onto the bolt on either side of the opening. The nuts therefore "sandwich" the portion of the frame that defines the opening such that the cutting unit is held securely in the desired vertical position with respect to the rollers. Wrenches can be used to adjust the nuts to new positions on the threads of the bolt to thereby shift the bolt vertically within the opening for adjustment of the cutting height. The adjustment of this second type of height adjustment mechanism therefore typically involves the use of tools. The adjustment of both nuts across a large portion of each threaded bolt may consume a relatively large amount of time. Furthermore, since the each side of the cutting unit typically carries a height adjustment mechanism, the operator must use a device known as a gauge bar to determine if the entire lateral width of the cutting unit has been adjusted to the desired height. The gauge bar is also used to determine whether the cutting unit is level from front to rear, and whether the front and rear rollers are parallel. Since a gauge bar and tools must be used to properly adjust the second type of cutting unit to a new cutting height, the mowing vehicle would typically be driven back to a shop area to perform the height adjustment operation. However, since the height adjustment of this type of cutting unit is relatively time consuming, an operator will instead often chose to change to an entirely different vehicle which has a cutting unit set at a different cutting height. In other words, cutting units of this type are typically dedicated to a single cutting height, with only precise adjustments being performed. A number of vehicles each provided with a cutting unit set at a different cutting height are often employed to mow the various areas where grass is to be cut at different heights, such as on fairways and roughs of a golf course.

A third type of cutting unit provides a slotted mounting arm which is coupled with the roller. A bolt received by the slot acts to secure the mounting arm to the cutting unit frame. The cutting height is adjusted by loosening the bolt and shifting the slotted mounting arm to a new position. This type of mechanism requires the use of tools, and also the use of a gauge bar to determine whether the cutting unit is at a level and uniform cutting height from side to side and front to rear. This type of mechanism is capable of infinite adjustment through a relatively large range of different cutting heights. However, the bolts can be tightened improperly such that they become loosened during cutting operations and allow the cutting unit to slip to a different cutting height. A low quality of cut can therefore result from the use of this type of height adjustment mechanism.

A fourth type of mechanism provides a pin and hole system similar to the first type of mechanism mentioned above, however a pattern of holes are provided in both the mounting plate and the cutting unit frame. The operator can insert the pin through particular holes to set the cutting unit to the desired height. An operator must typically refer to an instructional diagram or other written directions to determine the particular holes through which the pin must be inserted to accomplish a particular cutting height. Height adjustment operations for this type of mechanism are often performed in a workshop where the operator has access to the instructional diagram. Travel time is therefore often incurred when the cutting height is adjusted. Furthermore, the pins are loose parts that could be lost if field adjustments are performed, and gaps can exist between the pin and mounting plate or frame such that rattle, wear and poor cut quality can occur.

It would therefore be desirable to provide a reel mower cutting unit height adjustment mechanism which does not involve the use of loose parts, and that is easily adjustable in the field to a variety of cutting heights with the use of only one or a small number of tools. It would also be desirable to provided a height adjustment mechanism which firmly and positively secures the cutting unit at the predetermined cutting height. It would be desirable for such a mechanism to be infinitely adjustable across an relatively large range of cutting heights, and without requiring reference to an instructional diagram. It would be desirable for such a mechanism to be adjustable for leveling the cutting unit from side to side and from front to rear.

SUMMARY OF THE INVENTION

The preferred embodiment of the present invention provides a mechanism for adjusting the height at which vegetation is cut by a reel mower cutting unit. A rack member is coupled with the cutting unit, and includes a plurality of teeth vertically arranged. A bracket member is coupled with a ground engaging roller means, and includes a plurality of generally vertically arranged teeth engagable with the teeth of the rack member for generally preventing vertical shifting of the bracket member with respect to the rack member and cutting unit. The position of the bracket member with respect to the rack member thereby generally determines the vertical position of the cutting unit with respect to the ground engaging roller means, thereby setting the height at which vegetation is cut by the cutting unit. A coupling means is provided for selectively and releasably securing the teeth of the bracket member in engagement with the teeth of the rack member. The coupling means or bolt is selectively releasable for vertically shifting the bracket member with respect to the rack member for allowing the cutting height to be adjusted. A mechanism is also provided for fine adjusting the vertical position of the rack member with respect to the cutting unit. The fine adjusting means includes a threaded member rigidly coupled with the rack member and extending generally vertically for being received by an opening formed by the cutting unit frame. A pair of nuts are threaded onto the threaded member on either side of the opening in the frame for securing the rack member in a selected vertical position with respect to the cutting unit. A securing means is provided for securing the rack in abutment with the cutting unit frame, and includes bolts received by slots formed in the cutting unit frame. The bolts are also received by threaded holes formed in the rack member. The preferred embodiment includes four height adjustment mechanisms provided at respective corners of the cutting unit frame. The fine adjustment mechanisms are therefore adapted for leveling the cutting unit from side to side and fore and aft.

DESCRIPTION OF THE PREFERRED EMBODIMENT

Figure 1:
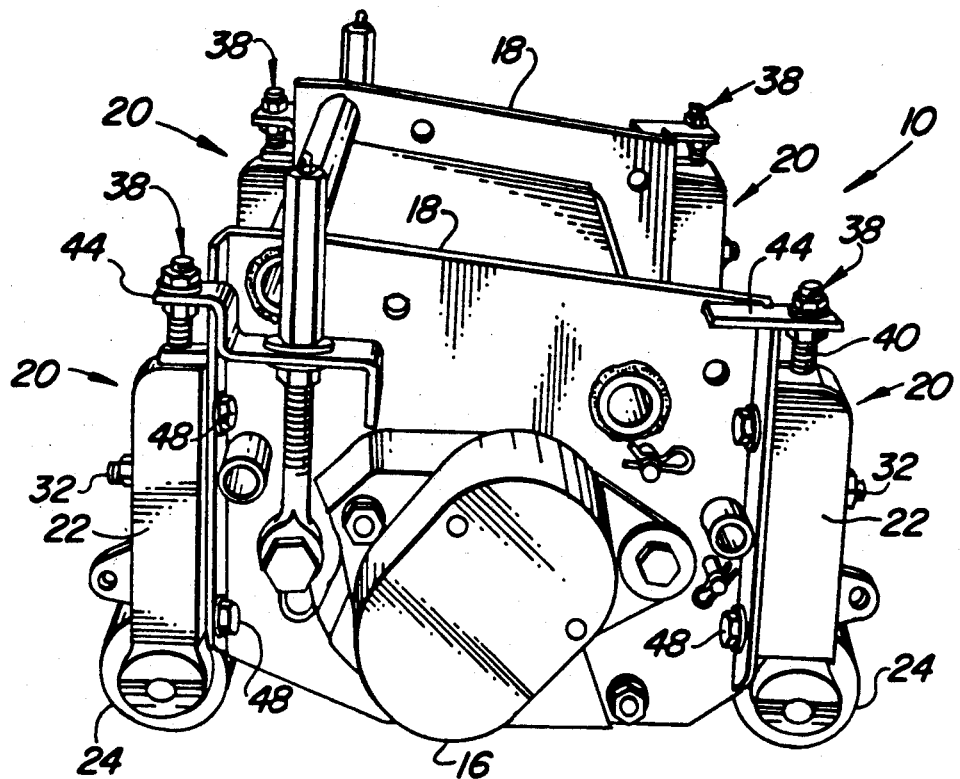
FIG. 1 is a perspective view from the side of a reel mower cutting unit according to the present invention.
Figure 2:
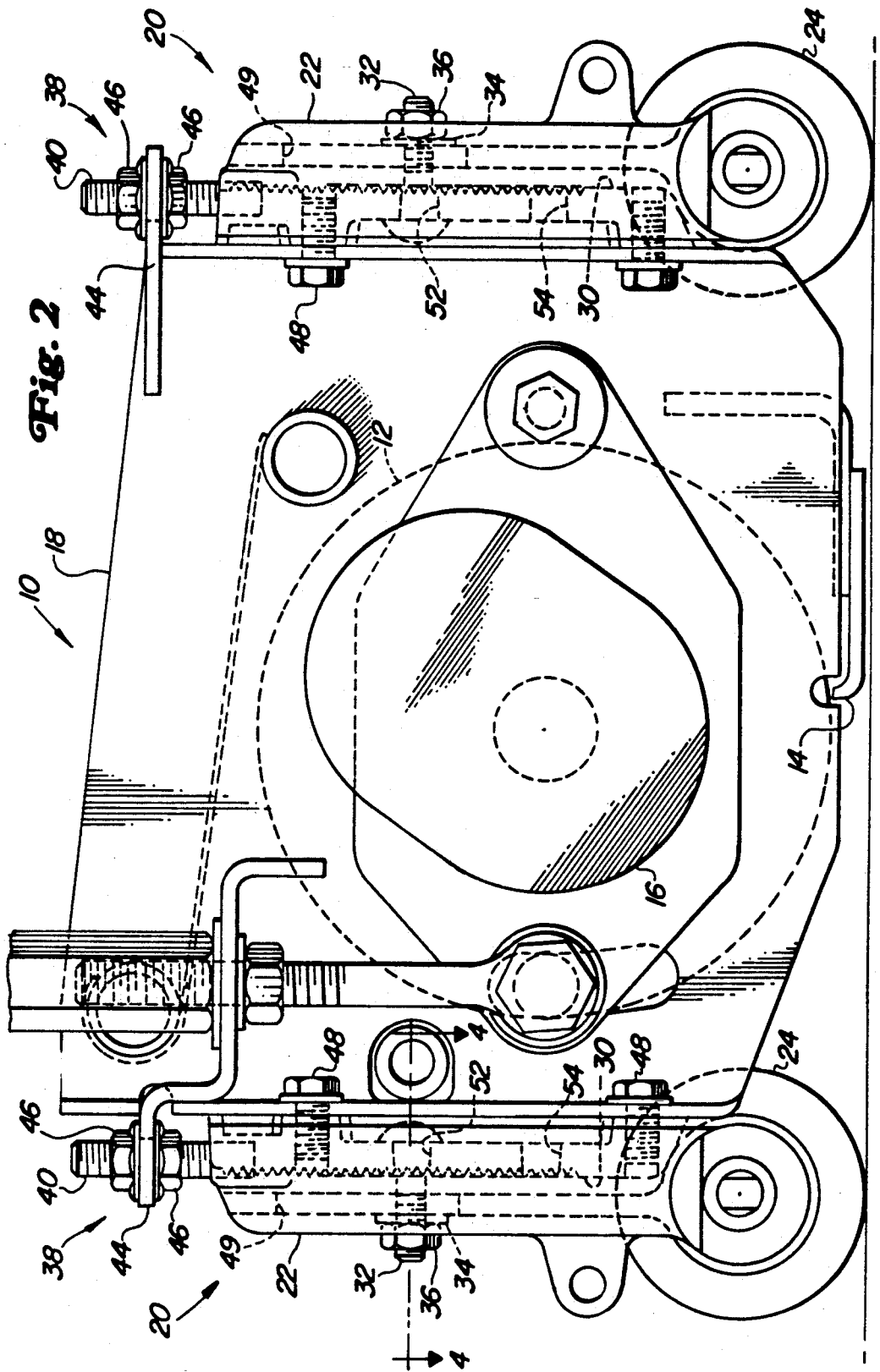
FIG. 2 is a side view of the cutting unit according to the present invention.

Referring now to FIGS. 1 and 2, there is shown a reel mower cutting unit 10 according to the present invention. A plurality of blades are coupled together to form a generally cylindrical reel 12 which rotates about a horizontal axis in close proximity to a bedknife 14 for cutting vegetation with a scissoring action. The reel 12 is driven by a hydraulic motor 16 carried at one side of a frame 18 which generally houses and supports the reel 12.

Figure 3:
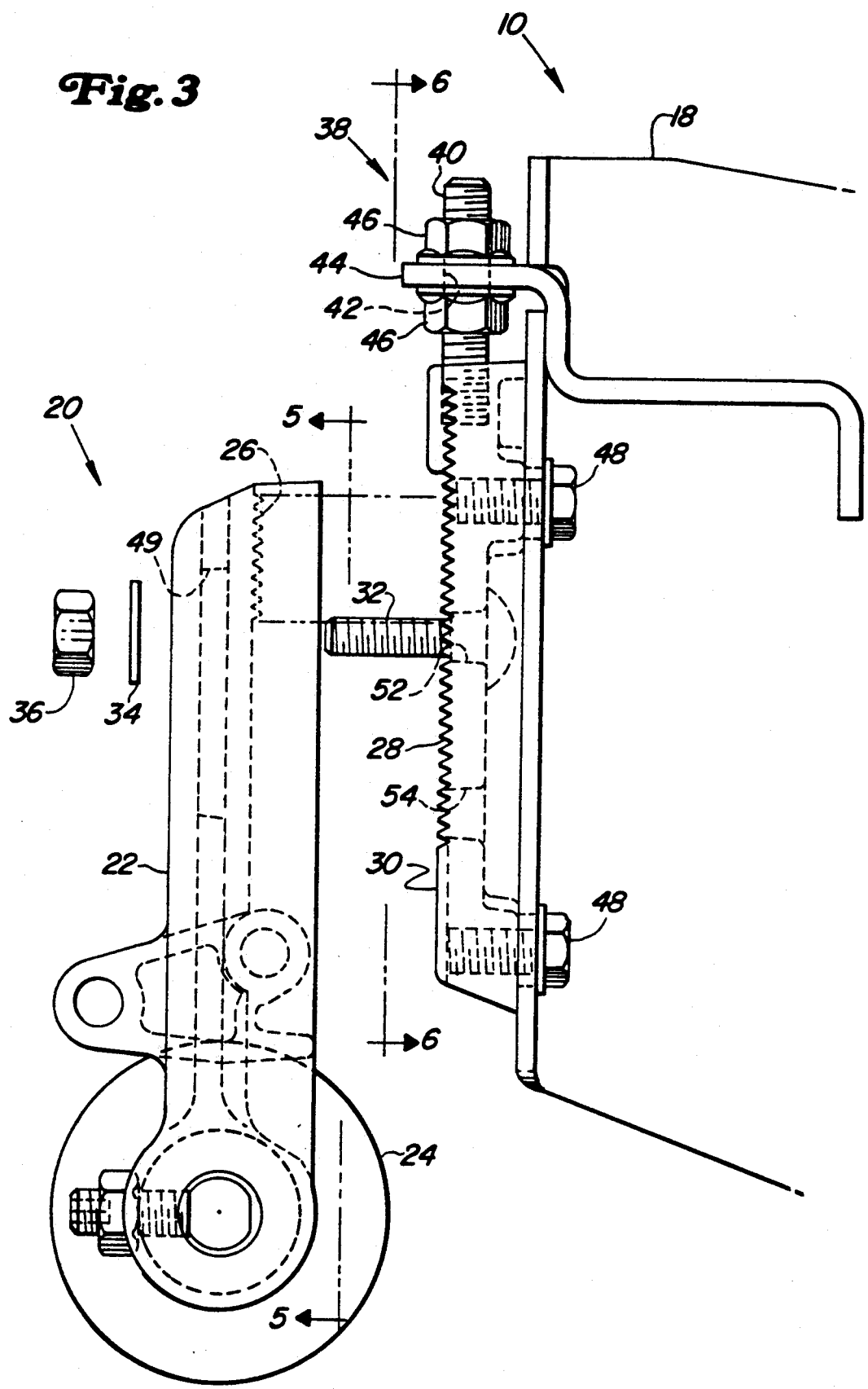
FIG. 3 is an exploded side view of one of the height adjustment mechanisms according to the present invention.
Figure 4:
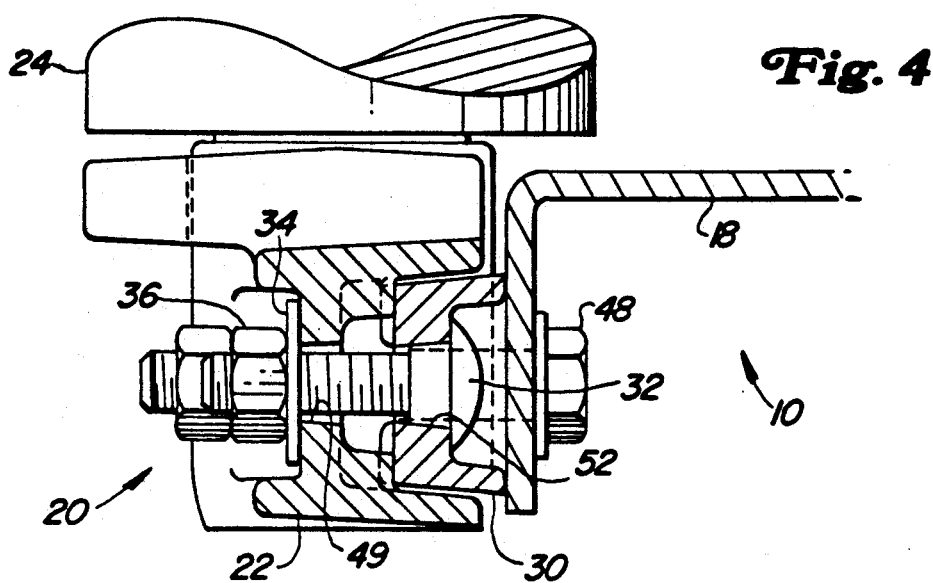
FIG. 4 is a sectional view of one of the height adjustment mechanisms taken along line 4 in FIG. 2.
Figure 5:
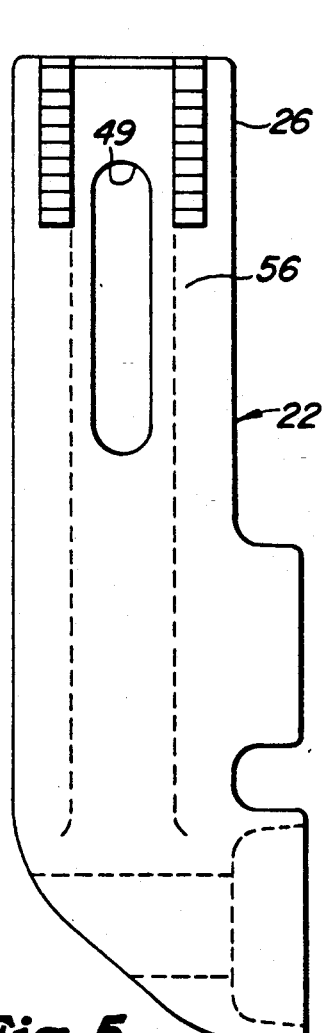
FIG. 5 is a view of the bracket member taken along line 5 in FIG. 3.
Figure 6:
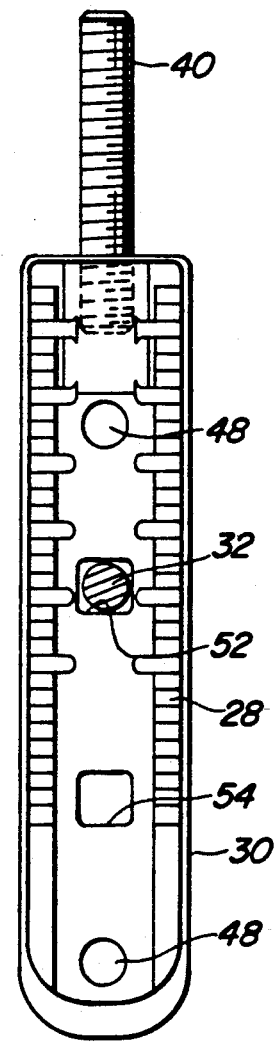
FIG. 6 is a view of the rack member taken along line 6 in FIG. 3.

A height adjustment mechanism 20 is coupled to each of the four corner portions of the cutting unit frame 18. As best seen in FIG. 3, each height adjustment mechanism 20 includes a bracket member 22 which supports a roller 24 that rolls across the surface of the ground. A plurality of teeth 26 are defined by the bracket member 22 and abut teeth 28 (as best seen in FIG. 3) formed in a rack member 30 carried by the frame 18. As shown in FIGS. 3 and 4, a bolt 32, washer 34 and nut 36 act to clamp the bracket and rack members 22 and 30 together and maintain the engagement of the respective sets of teeth 26 and 28. The bracket and rack members 22 and 30 are thereby securely coupled together to prevent relative movement. The nut 36 can be loosened to allow an operator to shift the bracket member 22 vertically relative to the rack member 30 to adjust the height at which the cutting unit 10 is carried above the ground. The cutting height is thereby selectively adjustable.

A fine adjustment means 38 is provided near the top of the rack member 30. The fine adjustment mechanism 38 includes a threaded rod means 40 rigidly carried by the rack member 30 and extending generally vertically therefrom. The threaded rod 40 is slidably or shiftably received by an opening 42 formed by a portion 44 of the frame 18. A pair of nuts 46 are threaded onto the rod means 40 and abut the frame portion 44 which defines the opening 42. The position of the nuts 46 determines the vertical position of the frame 18 with respect to the threaded rod 40, thereby serving to precisely determine the cutting height of the unit 10. A pair of bolts 48 are positioned within vertical slots formed by the cutting unit frame 18 and act to further secure the rack member 30 to the cutting unit 10 at the position determined by the fine adjustment mechanism 38.

Next, the operation of the present invention will be discussed. To accomplish an adjustment of the cutting height, an operator of the present invention loosens the bolt 32 sufficiently to disengage the teeth 26 and 28 from each other. The operator can then shift the bracket 22 up or down to a new vertical position relative to the rack member 30. The bracket 22 includes a vertical slot 49 which receives the bolt 32 and allows the bracket member 22 to shift vertically. The bolt 32 can then be tightened again to firmly hold the teeth 26 and 28 in engagement with each other at the adjusted position.

The crests of the teeth 26 and 28 are vertically spaced at one-eighth inch ($\frac{1}{8}''$) increments. During cutting height adjustment the operator can count the number of teeth he is shifting the bracket 22 to determine how far he has changed the cutting height. The triangular shape of the teeth 26 and 28 help to positively and precisely locate the position of the bracket 22 with respect to the rack member 30. The four height adjustment mechanisms 20 located at the corners of the cutting unit frame 18 can be adjusted by the same number of teeth such that each corner of the cutting unit 10 is raised or lowered the same amount. The height of each corner of the cutting unit 10 is therefore adjusted by generally identical amounts, such that the cutting unit 10 remains level after being adjusted. The present invention therefore provides an incremental height adjustment feature that generally eliminates the need for a gauge bar when performing most height adjustments.

Most height adjustments will be accomplished in the field by loosening the bolt 32, disengaging the teeth 28 and 26 of the rack 30 and bracket 22, and shifting the bracket 22 to a desired vertical position. The height adjustment mechanism 20 according to the present invention also includes a fine adjustment mechanism 38 which can be used for leveling the cutting unit 10 from side to side, or in the fore and aft direction. This leveling operation is not required each time the height setting is changed in the field. Rather, the precise leveling or fine adjustment operation will be performed in a workshop at regular intervals such as on a daily or weekly basis to assure that the cutting unit 10 is level. The need for a gauge bar to achieve most cutting height adjustments is therefore eliminated.

The fine adjustment mechanism can also be utilized to achieve cutting heights that fall between the incremental heights allowed by the teeth 26 and 28 of the bracket 22 and rack 30. The cutting height is adjusted to within an eighth of an inch ($\frac{1}{8}$") of the desired cutting height by shifting the bracket 22 relative to the rack 30, and then the fine adjustment mechanism 38 can be used to further precisely adjust the cutting height. The present invention therefore allows infinite adjustment of the cutting height across an entire range of cutting heights.

The teeth 26 of the bracket member extend a relatively short distance as compared to the teeth 28 of the rack member 30. If the bracket teeth 26 extended over a large vertical distance, the tolerance build-up created during the manufacturing process might cause some of the teeth 26 and 28 of the bracket 22 and rack 30 to be misaligned such that the bracket and rack members 22 and 30 would not mate precisely with each other. By providing bracket teeth 26 that only extend over a short vertical distance, the rack 30 and bracket 22 can be manufactured using relatively inexpensive processes since the tolerances of the teeth 26 and 28 do not have to be extremely small or accurate. Similarly, the threaded rod means 40, whose threads require relatively precise manufacturing, is a separate part which is attached as by a pin (not shown) to the rack member 30, and therefore the rack member 30 can be manufactured using relatively low cost and low precision processes. The cost of manufacturing the present invention is correspondingly reduced.

A pair of bolt openings 52 and 54 are provided for receiving the bolt 32 when the bracket member 22 is positioned in different vertical ranges. When the teeth 26 of the bracket 22 are positioned near the top of the rack member 30 for a relatively low cutting height, the bolt 32 is positioned within the top bolt opening 52. When the teeth 26 of the bracket member 22 are positioned near the bottom of the rack member 30 for a relatively high cutting height, the bolt 32 is received by the lower bolt opening 54. By providing a pair of bolt openings 52 and 54, the bolt 32 can be positioned in close proximity to the engaged teeth 26 and 28 to more rigidly secure the teeth 26 and 28 in engagement. The bolt 32 also acts to press the portion 56 of the bracket member 22 which is beneath the bracket teeth 26 into abutment with the rack member teeth 28. Relatively large surface areas of the rack and bracket members 30 and 22 are pressed together by the bolt 32 to more rigidly and securely hold the bracket member 22 and roller 24 in the desired vertical position relative to the cutting unit 10. The loads associated with pressing together the rack 30 and bracket 22 are distributed over relatively large surface areas, thereby minimizing the stress experienced by the rack 30 and bracket 22. Also, since the bolt 32 is a separate piece and not formed integral with the rack member 30, the bolt 32 can easily be replaced if it wears or is stripped by an operator.

The teeth 26 and 28 of the rack member 30 and bracket member 22 are generally triangular in shape, and act to positively locate the bracket member 22 with respect to the rack member 30. If the bolt 32 begins to become loosened, the teeth 26 and 28 will act to maintain the bracket member 22 at the selected height. The present invention thereby generally prevents a slight loosening of parts from causing the cutting height to be adversely affected.

I claim:

1. A mechanism for adjusting the height at which vegetation is cut by a reel mower cutting unit, wherein said cutting unit includes a frame, said mechanism comprising:
    a rack member coupled with the cutting unit, and having a plurality of teeth vertically arranged,
    a bracket member coupled with a ground engaging roller means, said bracket member having a plurality of generally vertically arranged teeth engagable with the teeth of the rack member for generally preventing vertical shifting of the bracket member with respect to the rack member and cutting unit, and for setting the vertical position of the cutting unit with respect to the ground engaging roller means, thereby setting the height at which vegetation is cut by the cutting unit,
    a coupling means for selectively and releasably securing the teeth of the bracket member in engagement with the teeth of the rack member, said coupling means being selectively releasable for vertically shifting the bracket member with respect to the rack member and cutting unit for adjusting the vertical position of the cutting unit with respect to the ground engaging roller means, thereby adjusting the height at which the cutting unit cuts vegetation.

2. The invention of claim 1, and further comprising means for fine adjusting the vertical position of the rack member with respect to the cutting unit.

3. The invention of claim 2, wherein said fine adjusting means further comprises:
    a threaded member rigidly coupled with the rack member and extending generally vertically, said threaded member being received by an opening formed by the frame of the cutting unit,
    a pair of nut means threaded onto the threaded member, one of said nut means being abutable with the frame of the cutting unit above the opening and the other nut means being abutable with the frame from beneath the opening for securing the rack member in a selected vertical position with respect to the cutting unit.

4. The invention of claim 3, wherein the fine adjusting means further includes securing means for releasably and rigidly securing the rack member with the cutting unit at the vertical position determined by the fine adjustment means.

5. The invention of claim 4, wherein the securing means further comprises a bolt means received by an opening in the frame of the cutting unit, said bolt means also being received by a slot formed in the rack member.

6. The invention of claim 3, wherein at least a pair of respective rack members, bracket members and coupling means are coupled with the cutting unit and laterally spaced from each other for leveling the cutting unit from side to side.

7. The invention of claim 3, wherein said cutting unit frame includes four corner portions, and
at least four respective rack members, bracket members and coupling means are coupled with the cutting unit at respective corner portions of the cutting unit, said mechanism being adjustable for leveling the cutting unit in both the fore and aft, and lateral directions.

8. The invention of claim 1, wherein said coupling means further comprises a bolt received in an opening formed in the rack member, said bolt also being received by a vertically extending slot formed in the bracket member.

9. The invention of claim 1, wherein at least a pair of respective rack members, bracket members and coupling means are laterally spaced from each other and coupled with the cutting unit.

10. A mechanism for adjusting the height at which vegetation is cut by a reel mower cutting unit, wherein said cutting unit includes a frame, said mechanism comprising:
a rack member coupled with the cutting unit, and having a plurality of teeth vertically arranged,
a bracket member coupled with a ground engaging roller means, said bracket member having a plurality of generally vertically arranged teeth engagable with the teeth of the rack member for generally preventing vertical shifting of the bracket member with respect to the rack member and cutting unit, and for setting the vertical position of the cutting unit with respect to the ground engaging roller means, thereby setting the height at which vegetation is cut by the cutting unit,
a coupling means for selectively and releasably securing the teeth of the bracket member in engagement with the teeth of the rack member, said coupling means being selectively releasable for vertically shifting the bracket member with respect to the rack member and cutting unit for adjusting the vertical position of the cutting unit with respect to the ground engaging roller means, thereby adjusting the height at which the cutting unit cuts vegetation,
means for fine adjusting the vertical position of the rack member with respect to the cutting unit, said fine adjusting means further comprising
a threaded member rigidly coupled with the rack member and extending generally vertically, said threaded member being received by an opening formed by the frame of the cutting unit,
a pair of nut means threaded onto the threaded member, one of said nut means being abutable with the frame of the cutting unit above the opening and the other nut means being abutable with the frame from beneath the opening for securing the rack member in a selected vertical position with respect to the cutting unit.

11. The invention of claim 10, wherein said coupling means further comprises a bolt received in an opening formed in the rack member, said bolt also being received by a vertically extending slot formed in the bracket member.

12. The invention of claim 10, wherein the fine adjusting means further includes securing means for releasably and rigidly securing the rack member with the cutting unit at the vertical position determined by the fine adjustment means.

13. The invention of claim 12, wherein the securing means further comprises a bolt means received by an opening in the frame of the cutting unit, said bolt means also being received by a slot formed in the rack member.

14. The invention of claim 10, wherein at least a pair of respective rack members, bracket members and coupling means are laterally spaced from each other and coupled with the cutting unit.

15. The invention of claim 10, wherein at least a pair of respective rack members, bracket members and coupling means are coupled with the cutting unit and laterally spaced from each other for leveling the cutting unit from side to side.

16. The invention of claim 10, wherein said cutting unit frame includes four corner portions, and
at least four respective rack members, bracket members and coupling means are coupled with the cutting unit at respective corner portions of the cutting unit, said mechanism being adjustable for leveling the cutting unit in both the fore and aft, and lateral directions.

17. A mechanism for adjusting the height at which vegetation is cut by a reel mower cutting unit, wherein said cutting unit includes a frame, said mechanism comprising:
a plurality of rack members laterally spaced from each other and coupled with the cutting unit, said rack members each having a plurality of teeth vertically arranged,
a plurality of bracket members coupled with ground engaging roller means, each of said bracket members having a plurality of generally vertically arranged teeth engagable with the teeth of a respective rack member for generally preventing vertical shifting of the bracket member with respect to the rack member and cutting unit, and for setting the vertical position of the cutting unit with respect to the ground engaging roller means at the location of each rack member and bracket member, thereby setting the height at which vegetation is cut by the cutting unit,
a plurality of coupling means for selectively and releasably securing the teeth of the bracket members in engagement with the teeth of respective rack members, said coupling means being selectively releasable for vertically shifting the bracket members with respect to each rack member and cutting unit for adjusting the vertical position of the cutting unit with respect to the ground engaging roller means, thereby adjusting the height at which the cutting unit cuts vegetation, and
means for individually fine adjusting the vertical position of each rack member with respect to the cutting unit, for fine adjusting the height at which vegetation is cut and for laterally leveling the cutting unit.

18. The invention of claim 17 wherein said coupling means further comprises a bolt received in an opening formed in the rack member, said bolt also being received by a vertically extending slot formed in the bracket member.

19. The invention of claim 18, wherein said fine adjusting means further comprises:
- a threaded member rigidly coupled with the rack member and extending generally vertically, said threaded member being received by an opening formed by the cutting unit,
- a pair of nut means threaded onto the threaded member, one of said nut means being abutable with the frame of the cutting unit above the opening and the other nut means being abutable with the frame from beneath the opening for securing the rack member in a selected vertical position with respect to the cutting unit.

20. The invention of claim 19, wherein the fine adjusting means further includes securing means for releasably and rigidly securing the rack member with the cutting unit at the vertical position determined by the fine adjustment means.

21. The invention of claim 20, wherein the securing means further comprises a bolt means received by an opening in the frame of the cutting unit, said bolt means also being received by a slot formed in the rack member.

22. A mechanism for adjusting the height at which vegetation is cut by a reel mower cutting unit, wherein said cutting unit includes a frame having four corner portions, said mechanism comprising:
- a plurality of rack members each coupled with a respective corner of the cutting unit frame, said rack members each having a plurality of teeth vertically arranged,
- a plurality of bracket members coupled with ground engaging roller means, each of said bracket members having a plurality of generally vertically arranged teeth engagable with the teeth of a respective rack member for generally preventing vertical shifting of the bracket member with respect to the rack member and cutting unit, and for setting the vertical position of the cutting unit with respect to the ground engaging roller means at the location of each rack member and bracket member, thereby setting the height at which vegetation is cut by the cutting unit,
- a plurality of coupling means for selectively and releasably securing the teeth of the bracket members in engagement with the teeth of respective rack members, said coupling means being selectively releasable for vertically shifting the bracket members with respect to respective rack members for adjusting the vertical position of the cutting unit with respect to the ground engaging roller means, thereby adjusting the height at which the cutting unit cuts vegetation, and
- means for individually fine adjusting the vertical position of each rack member with respect to the cutting unit, for fine adjusting the height at which vegetation is cut and for leveling the cutting unit in both the lateral and fore and aft directions.

23. The invention of claim 22, wherein said coupling means further comprises a bolt received in an opening formed in the rack member, said bolt also being received by a vertically extending slot formed in the bracket member.

24. The invention of claim 22, wherein said fine adjusting means further comprises:
- a threaded member rigidly coupled with the rack member and extending generally vertically, said threaded member being received by an opening formed by the cutting unit,
- a pair of nut means threaded onto the threaded member, one of said nut means being abutable with the frame of the cutting unit above the opening and the other nut means being abutable with the frame from beneath the opening for securing the rack member in a selected vertical position with respect to the cutting unit.

25. The invention of claim 24, wherein the fine adjusting means further includes securing means for releasably and rigidly securing the rack member with the cutting unit at the vertical position determined by the fine adjustment means.

26. The invention of claim 25, wherein the securing means further comprises a bolt means received by an opening in the frame of the cutting unit, said bolt means also being received by a slot formed in the rack member.

* * * * *

UNITED STATES PATENT AND TRADEMARK OFFICE
CERTIFICATE OF CORRECTION

PATENT NO. : 5,241,810
DATED : 7 September 1993
INVENTOR(S) : Ronald L. Reichen

It is certified that error appears in the above-indentified patent and that said Letters Patent is hereby corrected as shown below:

On title page, item [54] "COT" should read --CUT--

Column 1, in the title, delete "COT" and insert --CUT--.

Signed and Sealed this

Twenty-fourth Day of May, 1994

Attest:

BRUCE LEHMAN

Attesting Officer      Commissioner of Patents and Trademarks